Figure 1:
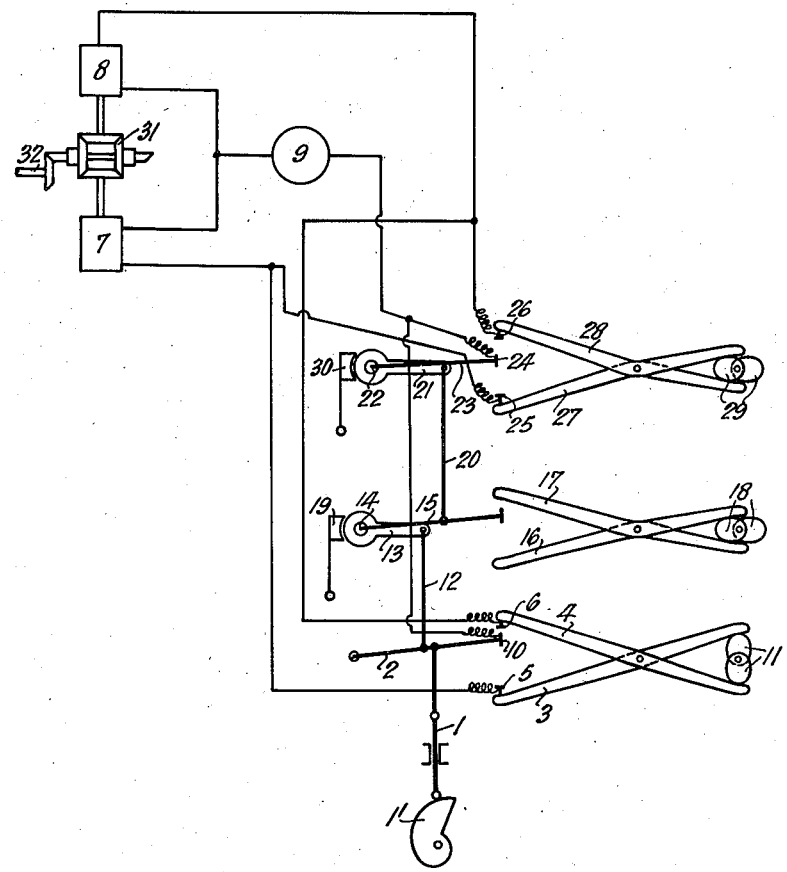

Dec. 15, 1936. A. IVANOFF ET AL 2,064,753
AUTOMATIC CONTROL APPARATUS
Original Filed Dec. 5, 1934 2 Sheets-Sheet 1

Inventors:
Alexander Ivanoff and
Giles Philip Eliot Howard,
By their attorneys,
Baldwin & Wight

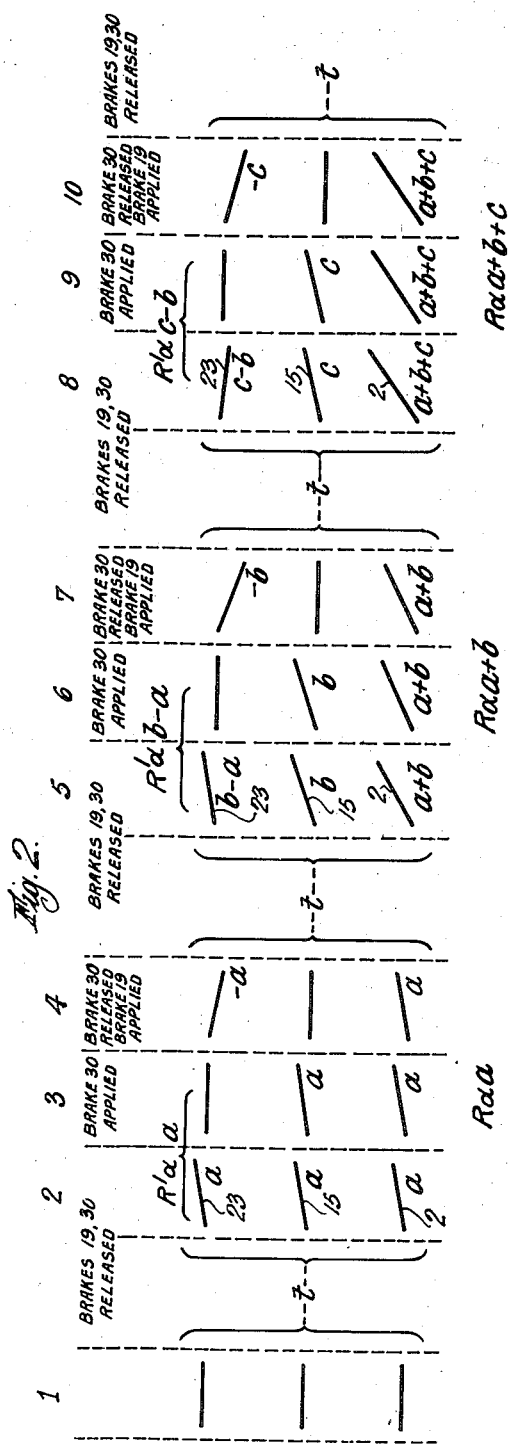

Patented Dec. 15, 1936

2,064,753

UNITED STATES PATENT OFFICE 2,064,753

AUTOMATIC CONTROL APPARATUS

Alexander Ivanoff and Giles Philip Eliot Howard, Luton, England, assignors to George Kent Limited, London, England Original application December 5, 1934, Serial No. 756,190. Divided and this application September 18, 1935, Serial No. 41,100. In Great Britain December 6, 1933

5 Claims. (Cl. 236—70)

This application is a division of our application No. 756,190, filed December 5th, 1934.

This invention relates to improvements in automatic control apparatus.

The invention is illustrated in the accompanying drawings in which Figure 1 is a diagrammatic view of apparatus in accordance with the invention and Figures 2 and 3 diagrams illustrating the operation of the apparatus. Figure 2 illustrates a succession of positions taken by the apparatus as operating to effect control of a condition changing as shown in Figure 3. Referring to Figure 1 a member 1 is operatively associated with a cam device 1' which is positioned in dependence on the value of the variable to be controlled, this member being linked to a first arm 2: associated with this arm are two scissor-like arms 3, 4 which carry a first pair of electrical contacts 5, 6 arranged to engage a first contact 10 on the arm 2, these contacts being connected to two electric motors 7, 8 fed from a common source 9 in the circuit of which is included a contact 10 on the arm 2. The arms 3, 4 are intermittently moved towards one another by cams 11.

The first arm 2 is connected by a link 12 to an arm 13 which is connected through a first friction slipping clutch indicated at 14, the device being of any well known type of friction slipping clutch device (i. e. a device consisting of two parts which are pressed together so that normally movement imparted to one part is transmitted frictionally to the other part while when one part is held the other part can overcome the friction between the parts and move relatively to the part which is held). This device connects the arm 2 to a second arm 15 which is arranged to be engaged by one or other of a pair of arms 16, 17 intermittently closed upon one another by cams 18. A first brake 19 is provided to clamp the arm 13 in position, this brake being operated intermittently to release the arm 13. The arm 15 is connected by a link 20 to an arm 21 which is connected through a second slipping clutch device 22 to a third arm 23 having a second contact 24 connected in the circuit of the supply source 9 and this contact is arranged to be engaged by a second pair of contacts 25, 26 which are carried by arms 27, 28 arranged intermittently to be closed upon one another by cams 29, these contacts being connected as shown to the motors 7 and 8. The arm 21 is arranged to be clamped intermittently by a second brake 30. The motors 7, 8 operate on opposite sides of a differential gear 31, the output of which is taken to the shaft 32 of a valve operating member. The operation will now be described with reference especially to the successive positions shown in Figure 2 in controlling a condition changing as shown in Figure 3.

In operation the first arm 2 will be positioned in a position dependent upon the value of temperature, pressure, or other condition being controlled. The second arm 15 will accordingly take up a position which varies with the deviation of the controlled condition and the apparatus is set so that when the condition is at the desired value it is in its central position (see position 1, Figure 2). Assuming that the value of the condition has deviated through an amount $a$ from the desired value, then (see position 2) the arm 2 will be at one side or the other of its central position by an amount proportional to the deviation. One or other of the contacts 5 or 6 (depending upon the sign of deviation) will engage the contact 10 for a period depending upon the deviation $a$ and this will cause one or other of the motors 7, 8 to be energized for a corresponding period and produce a control movement in one or other direction of the shaft 32. At the same time the brakes 19, 30 having been freed from the arms 13, 21, these arms 13, 21 and the arms 15, 23 will have taken up positions dependent upon that of the arm 2 relative to its central position and the second brake 30 is applied to the arm 21 and the arms 25, 26 closed upon one another to restore the third arm 23 to its central position (see position 3), the arm 21 remaining held by the brake 30 in the deviated position. The arms 25, 26 are now opened, the brake 30 is released and the first brake 19 applied; the arms 16, 17 are now closed upon one another and restore the arm 15 to its central position, a corresponding movement being transmitted to the arm 23 (see position 4). As the arm 15 is returned through a distance dependent upon the departure $a$ from its central position, the return is dependent upon the increase in the interval, and hence the arm 23 is now in a position dependent upon the deviation but of reversed sign or, in other words, on the rate of change of the condition. If, during the next interval $t$ (when both brakes 19, 30 are released), the condition deviates still further through an amount $b$ in the same sense as before the first arm 2 will move further from its central position so that it is in a position displaced from its central position by an amount proportional to the sum of the two deviations referred to (see position 5). Moreover the second arm 15 (which was restored to its central position) will take up a position dependent upon the second deviation $b$ and the third arm 23 will take up a position dependent upon the difference between the two successive deviations $b$ and $a$, i. e. dependent upon the rate of change of the rate of change of the condition or, in other words, on the second differential. The arm 23 is again restored to its central position (position 6) by the arms 25, 26, and thereafter the arm 15 is centralized (position 7) so that the arm 23 takes up a position dependent upon the deviation $b$ but of reverse sign. Again, if the condition further deviates through an amount $c$, the arm 2 will take up a position dependent on the sum of the deviations $a$, $b$, and $c$ and with the same sequence as before (see positions 8, 9, 10) the arm 23 will finally take a position dependent on the deviation $c$ but of reverse sign and so on.

One or other of the contacts 25, 26 thus, by engaging the contact 24 (when the arm 23 is in position 2, 5 or 8), transmits to the appropriate motor 7 or 8 a response dependent upon the position of the arm 23 and hence upon the second differential and as these responses are additive in their effects, the degree of control exercised by the contacts 24, 25 and 26 is dependent upon the integration of the second differential. In addition, the contacts 5, 6 and 10 transmit impulses to the motor in dependence upon the total deviation and hence as the impulses are additive, the degree of control is dependent upon the integral of the deviation. Hence the control valve is actuated in dependence on the integral of the deviation and of the rate of the rate of change.

It will be understood that the operation has been described in the various stages for convenience of description, for, in practice, the arms 27 and 28 would be closed simultaneously with the arms 3 and 4, then the arms 16, 17 would be closed, and then there would be an interval during which the brakes 19 and 30 would be released for the parts to re-set themselves in accordance with the change in the value of the variable.

What we claim is:—

1. Automatic control mechanism for maintaining a variable condition at (or sensibly at) a predetermined value and comprising a first member, means operating to displace the first member in dependence on the extent of deviation of the condition, a second member, a third member, means operating normally to transmit movement from the first member to the second and third members, means operating periodically to displace the third member to a predetermined datum position independently of the first and second members, means operating thereafter to displace the second member to a predetermined datum position independently of the first member, the displacement of the second member being transmitted to the third member, means transmitting control impulses of a duration dependent upon the positions of the first and third members, a control device effecting regulation of the variable condition and an operating mechanism which integrates the control impulses and applies a regulation to the control device in dependence on the said integration.

2. Automatic control mechanism for maintaining a variable condition at (or substantially at) a predetermined value and comprising a first member, means operating to displace the first member to an extent dependent on the deviation of the condition, a second movable member, a third movable member, a first slipping clutch device connecting the second member to the first member, a second slipping clutch device connecting the third member to the second member, a first device for holding the first member against movement, a second device for holding the second member against movement, a first mechanism operating intermittently to move the third member to a predetermined datum position, a second mechanism operating after the first mechanism has operated to move the second member to a predetermined datum position, means operated in unison with the two mechanisms and operating to render firstly both holding devices inoperative and then to render the second holding device operative while the first mechanism is operative and then operating to render the first holding means operative while the second mechanism is operative, means transmitting control impulses of a duration dependent upon the positions of the first and third members, a control device effecting regulation of the variable condition and an operating mechanism which integrates the control impulses and applies a regulation to the control device in dependence on the said integration.

3. Automatic control apparatus for maintaining a variable condition at (or approximately at) a predetermined value and comprising a first pivotally mounted arm, means operating to rock the arm through an angle dependent upon the deviation of the variable condition, a second pivotally mounted arm, a third pivotally mounted arm, a fourth arm pivoted coaxially with the second arm, a first slipping clutch device connecting the second and fourth arm, a fifth arm pivoted coaxially with the third arm, a second slipping clutch device connecting the third and fifth arms, a first link connecting the fourth arm and the first arm, a second link connecting the second arm and the fifth arm, a first brake device arranged to hold the fourth arm, a second brake device arranged to hold the fifth arm, a first mechanism operating intermittently to move the third arm to a predetermined position, a second mechanism operating intermittently to move the second arm to a predetermined position, means operating the brake devices and operating firstly to render both devices inoperative and then, while the first mechanism is operative to render the second brake device operative and thereafter, while the second mechanism is operative to render the first brake device operative, means transmitting control impulses of a duration dependent upon the positions of the first and third arms, a control device effecting regulation of the variable condition and an operating mechanism which integrates the control impulses and applies a regulation to the control devices in dependence on the said integration.

4. Automatic control mechanism for maintaining a variable condition at (or sensibly at) a predetermined value and comprising a first member, means operating to displace the first member in dependence on the extent of deviation of the condition, a second member, a third member, means operating normally to transmit movement from the first member to the second and third members, a first mechanism operating periodically to displace the third member to a predetermined datum position independently of the first and second members, a second mechanism operating thereafter to displace the second member to a predetermined datum position independently of the first member, the displacement of the second member being transmitted to the third member, a first contact displaceable in dependence on the displacement of the first member, a first pair of contacts movable intermittently upon the said first contact whereby an electrical contact is made between the said first contact and one of the first pair of contacts for a duration dependent upon the displacement of the first member, a second contact displaceable in dependence on the displacement of the third member, a second pair of contact devices movable synchronously with the first mechanism, whereby an electrical contact is made between the second contact and one of the second pair of contacts and for a duration dependent upon the displacement of the second contact, a control device regulating the value of the variable condition, and an electrically operated device regulated by the electrical contacts and arranged to integrate the intermittent duration of contact and to actuate the control device in dependence on the said integration.

5. Automatic control mechanism for maintaining a variable condition at (or substantially at) a predetermined value and comprising a first member, means operating to displace the first member to an extent dependent on the deviation of the condition, a second movable member, a third movable member, a first slipping clutch device connecting the second member to the first member, a second slipping clutch device connecting the third member to the second member, a first device for holding the first member against movement, a second device for holding the second member against movement, a first mechanism operating intermittently to move the third member to a predetermined datum position, a second mechanism operating after the first mechanism has operated to move the second member to a predetermined datum position, means operated in unison with the two mechanisms and operating to render firstly both holding devices inoperative and then to render the second holding device operative while the first mechanism is operative and then operating to render the first holding means operative while the second mechanism is operative, a first contact displaceable in dependence on the displacement of the first member, a first pair of contacts movable intermittently upon the said first contact whereby an electrical contact is made between the said first contact and one of the first pair of contacts for a duration dependent upon the displacement of the first member, a second contact displaceable in dependence on the displacement of the third member, a second pair of contact devices movable synchronously with the first mechanism, whereby an electrical contact is made between the second contact and one of the second pair of contacts and for a duration dependent upon the displacement of the second contact, a control device regulating the value of the variable condition, and an electrically operated device regulated by the electrical contacts and arranged to integrate the intermittent duration of contact and to actuate the control device in dependence on the said integration.

ALEXANDER IVANOFF.
GILES PHILIP ELIOT HOWARD.